US010853828B2

United States Patent
Wilson et al.

(10) Patent No.: US 10,853,828 B2
(45) Date of Patent: Dec. 1, 2020

(54) METHODS AND SYSTEMS FOR PROVIDING MULTIVARIATE TIME SERIES CLUSTERING FOR CUSTOMER SEGMENTATION

(71) Applicant: Flytxt BV, Nieuwegein (NL)

(72) Inventors: Jobin Wilson, Ernakulam (IN); Prateek Kapadia, Mumbai (IN); Vinod Vasudevan, Trivandrum (IN); Santanu Chaudhury, Delhi (IN); Brejesh Lall, Delhi (IN)

(73) Assignee: FLYTXT B.V, Nieuwegein (NL)

(*) Notice: Subject to any disclaimer, the term of this patent is extended or adjusted under 35 U.S.C. 154(b) by 737 days.

(21) Appl. No.: 15/405,118

(22) Filed: Jan. 12, 2017

(65) Prior Publication Data

US 2017/0124581 A1 May 4, 2017

Related U.S. Application Data

(63) Continuation-in-part of application No. 13/407,440, filed on Feb. 28, 2012, now abandoned.

(30) Foreign Application Priority Data

Feb. 28, 2011 (IN) .............................. 597/CHE/2011

(51) Int. Cl.
*G06Q 30/02* (2012.01)
*G06F 16/28* (2019.01)
(Continued)

(52) U.S. Cl.
CPC ......... *G06Q 30/0204* (2013.01); *G06F 11/30* (2013.01); *G06F 16/2465* (2019.01);
(Continued)

(58) Field of Classification Search
CPC ..................................................... G06Q 30/00
See application file for complete search history.

(56) References Cited

U.S. PATENT DOCUMENTS

| 8,495,680 B2* | 7/2013 | Bentolila | G06Q 30/0251 725/14 |
| 9,538,401 B1* | 1/2017 | Ouyang | H04W 24/02 |

(Continued)

OTHER PUBLICATIONS

Sismeiro, Catarina and Mizik, Natalie and Bucklin, Randolph E., Modeling Co-Existing Business Scenarios with Time Series Panel Data (Feb. 2006). Available at SSRN: https://ssrn.com/abstract=1016589 or http://dx.doi.org/10.2139/ssrn.1016589. (Year: 2006).*

(Continued)

*Primary Examiner* — Eric R Netzloff
(74) *Attorney, Agent, or Firm* — Mannava & Kang, P.C.; Vinay Malik

(57) ABSTRACT

Disclosed herein are methods and systems for providing multivariate time series clustering for customer segmentation. The system comprises of a model management unit that devices a customer segmentation procedure based on temporal variations of user preferences, using MTS clustering, and utilize the discovered clusters to learn association rules specific to each clusters, and improves campaign targeting. The order of the VAR model is fixed based on the nature of the data and length of the time series.

8 Claims, 7 Drawing Sheets

(51) Int. Cl.
*G06F 16/2458* (2019.01)
*G06F 11/30* (2006.01)
*G06N 20/00* (2019.01)

(52) U.S. Cl.
CPC ........... *G06F 16/285* (2019.01); *G06N 20/00* (2019.01); *G06Q 30/02* (2013.01)

(56) References Cited

U.S. PATENT DOCUMENTS

| | | | |
|---|---|---|---|
| 9,705,817 B2* | 7/2017 | Lui | H04L 43/0817 |
| 2006/0269144 A1* | 11/2006 | Kubota | G06K 9/622 |
| | | | 382/225 |
| 2008/0140592 A1* | 6/2008 | Ben-Hur | G06K 9/6218 |
| | | | 706/12 |
| 2010/0169158 A1* | 7/2010 | Agarwal | G06K 9/6226 |
| | | | 705/7.11 |
| 2010/0228604 A1* | 9/2010 | Desai | G06Q 30/02 |
| | | | 705/7.31 |
| 2013/0079938 A1* | 3/2013 | Lee | G06Q 30/02 |
| | | | 700/291 |
| 2014/0358644 A1* | 12/2014 | Anand | G06Q 50/01 |
| | | | 705/7.37 |
| 2016/0260052 A1* | 9/2016 | Ray | G06Q 10/087 |

OTHER PUBLICATIONS

Liao, T.W. (2005) Clustering of Time-Series Data—A Survey. Pattern Recognition, 38, 1857-1874. https://doi.org/10.1016/j.patcog. 2005.01.025 (Hereafter: Liao). (Year: 2005).*

Sismeiro, Catarina & Mizik, Natalie & E. Bucklin, Randolph. (2012). Modeling coexisting business scenarios with time-series panel data: A dynamics-based segmentation approach. International Journal of Research in Marketing. 29. 134-147. 10.1016/j.ijresmar. 2011.08.005. (Year: 2012).*

Bulteel, K., Tuerlinckx, F., Brose, A., Ceulemans, E. (2016b). Using raw VAR regression coefficients to build networks can be misleading. Multivariate Behavioral Research, 51(23), 330-344. doi:10. 1080/00273171.2016.1150151 (Hereafter: Bulteel (Year: 2016).*

* cited by examiner

METHODS AND SYSTEMS FOR PROVIDING MULTIVARIATE TIME SERIES CLUSTERING FOR CUSTOMER SEGMENTATION

CROSS-REFERENCE TO RELATED APPLICATIONS

This application is a continuation-in-part application of U.S. patent application Ser. No. 13/407,440 filed on Feb. 28, 2012 and claims priority from the Indian patent application 597/CHE/2011 filed on Feb. 28, 2011.

TECHNICAL FIELD

The embodiments herein generally relate to the field of data analytics and more particularly to clustering techniques based on time series.

BACKGROUND

Due to the advancement in Temporal Data Mining (TDM) with diverse applications in finance, econometrics, medical diagnostics, multimedia, user profiling, recommender systems and personalization, Multivariate Time Series (MTS) clustering techniques are attracting a lot of interest.

The existing time series clustering approaches treat each time series individually and have separate models for them, due to which it limits their scalability and utility in applications that require clustering millions of individual MTS. For time series data, the generalization will be less due to sparsity. In many practical applications such as targeted campaigning for mobile subscribers, aggregated service usage trends can be very short (6-12 units of length) and cannot satisfy stationarity criteria.

BRIEF DESCRIPTION OF FIGURES

The embodiments of this invention are illustrated in the accompanying drawings, throughout which like reference letters indicate corresponding parts in the various figures. The embodiments herein will be better understood from the following description with reference to the drawings, in which.

DETAILED DESCRIPTION OF EMBODIMENTS

Figure 1:
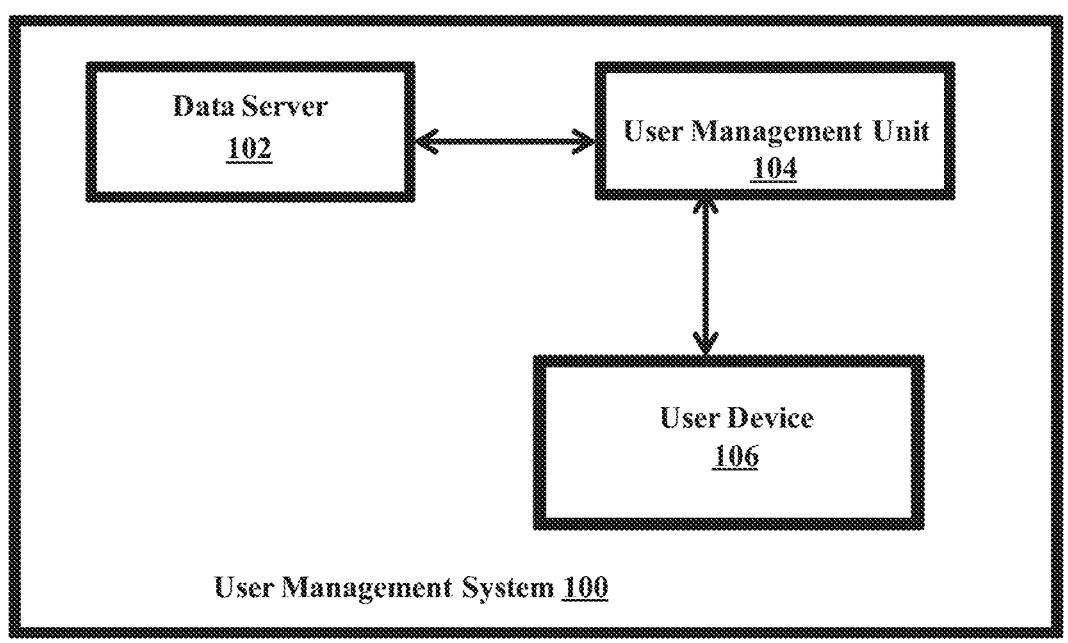
FIG. 1 illustrates a block diagram of user management system, according to the embodiments disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Embodiments herein disclose methods and systems for providing multivariate time series clustering for customer segmentation.

Another object of the embodiments disclosed herein is to improve targeted promotions and marketing campaigns executed by communication service providers using association rule mining on customer segments, derived based on temporal variations of user preferences.

Referring now to the drawings, and more particularly to FIGS. 1 through 4, where similar reference characters denote corresponding features consistently throughout the figures, there are shown embodiments.

FIG. 1 illustrates a block diagram of user management system, as disclosed in the embodiments herein. The user management system 100 further comprises of a data server 102, a user management unit 104, and at least one user device 106. The data server 102 can be configured to act as a data repository for saving all data. The data server 102 can be further configured to save information, which can be used by the user management system 100 to differentiate between different data. The data server 102 can be further configured to save any other data that is required to perform clustering of customer's time variant preferences.

The user management unit 104 can be configured to device a user based MTS clustering. The user management unit 104 can be further configured to learn linear time series models from multiple time series instances. The user management unit 104 can be further configured to apply to short time series, which is not stationary The user device 106 can be any device such as but not limited to a mobile phone, a personal computer, a wearable computing device, and a tablet PC, that can be configured to communicate with the user management unit 104.

Figure 2:
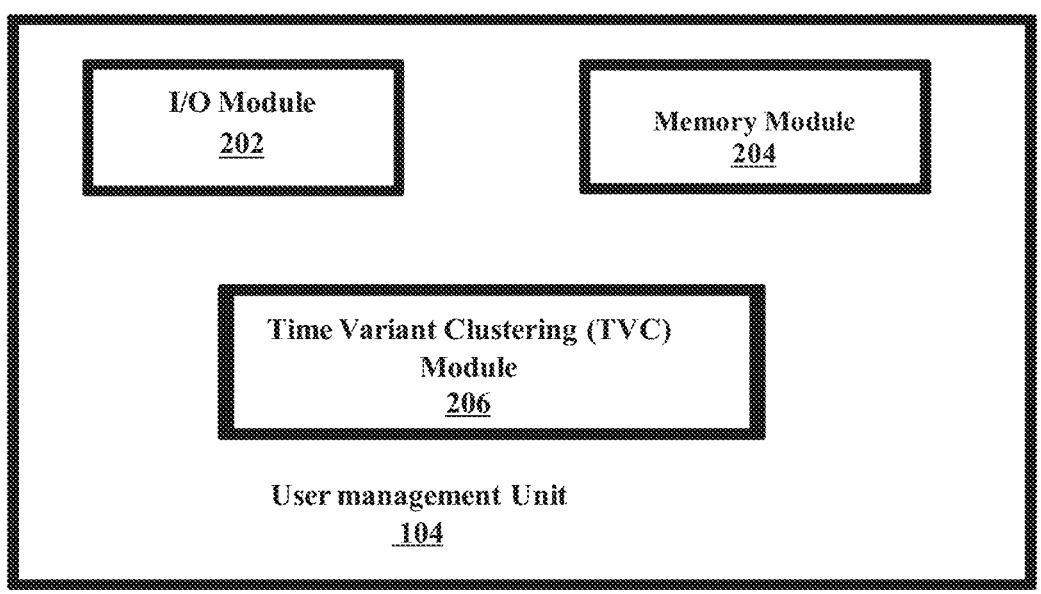
FIG. 2 is a block diagram illustrating a plurality of components of user management unit, according to embodiments as disclosed herein.

FIG. 2 is a block diagram depicting an exemplary user management unit 104, according to the embodiments disclosed herein. The user management unit 104 comprises of an Input/Output (I/O) module 202, a memory module 204 and a Time Variant Clustering (TVC) Module 206. In an embodiment, The I/O module 202 acts as an interface that connects various other systems and devices through cellular networks, Wi-Fi networks, and device-to-device communication and the like. The I/O module 202 can be used to collect inputs from the user and can use any suitable hardware and/or software means, and communication technologies/interfaces to effectively receive inputs and provide outputs. The I/O module 202 can also enable the user to access the output.

The memory module 204 can be used to store data and comprise of at least one of volatile and/or non-volatile memory. The inputs received from the user can be stored in the memory module 204 for further processing. The output can also be stored in the memory module 204. Further, the user management unit 100 comprises of a TVC Module 206 configured to provide linear time series models such as Auto Regressive (AR) for univariate and Vector Auto Regression (VAR) for multivariate time series data, from multiple time series instances, and further configured to be applied to short time series, which are not stationary.

The user management unit 102 performs MTS clustering by simultaneously estimating parameters of K separate VAR (p) models corresponding to K clusters in the MTS dataset as well as allocating each MTS to the cluster whose VAR equation best explains the MTS. The user management unit 102 further allocates each MTS to one of the K clusters and K separate VAR models are learned (one model per cluster). Further, the user management unit 102 reallocates each MTS to the cluster corresponding to the VAR model that produces minimal prediction Root mean squared error (RMSE) for that particular MTS. Further, an improved VAR model corresponding to each cluster is learned and the procedure is repeated until a convergence criterion is met.

Figure 3:
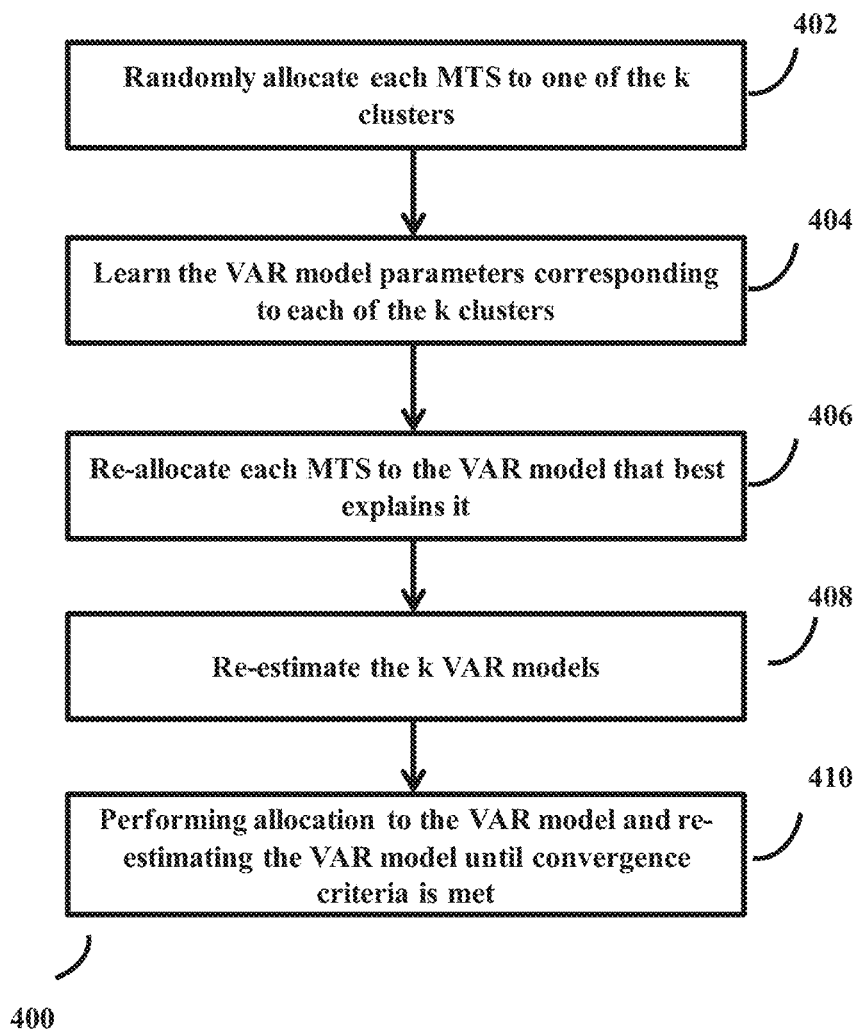
FIG. 3 is a flow diagram illustrating a method to device a customer segmentation procedure based on temporal variations of user preferences, using MTS clustering, according to the embodiments as disclosed herein.

FIG. 3 is a flow diagram illustrating a method to device a customer segmentation procedure based on temporal variations of user preferences, using MTS clustering, according to embodiments as disclosed herein. VAR equation is an equation corresponding to each variable, in which it is treated as a dependent variable and lagged values of all the dependent variables are included in the right hand side of the equation. In an embodiment, a VAR model describes evolution of a set of 'k' endogenous variables over the same time period, expressed as a linear function of their past values alone. In an embodiment, Each MTS is considered to be generated from a unique Vector auto regression (VAR) model representing a cluster, and a finite set of K such VAR models are assumed to explain the whole MTS dataset that need to be clustered. At step 402, the model management unit 102 randomly allocates each MTS to one of the k clusters. After allocating the MTS, at step 404, the model management unit 102 is configured to learn the VAR model parameters corresponding to each of the k clusters. In an embodiment, k VAR models will be learnt. The user management unit 102 learns the parameters associated with each VAR model and allocates each MTS to the model using a suitable means such as an Expectation-Maximization (EM) algorithm. Further, based on average prediction RMSE on each MTS, at step 406, the Time Variant Clustering (TVC) Module 206 of user management unit 102 is configured to allocate each MTS to the VAR model that best explains it. At step 408, Time Variant Clustering (TVC) Module 206 performs re-estimation for model parameters corresponding to each VAR model from multiple time series using expectation-maximization (EM) technique. At step 410, the TVC module is further configured to perform allocation to the VAR model and re-estimating the VAR model until convergence criteria is met. In an embodiment, the convergence criteria applied is that total number of reassignments occurring within iteration should be less than 5% of the total number of MTS instances and the total number of iterations should not exceed 30.

In an embodiment, association rule mining is performed, on each MTS cluster, to discover interesting association rules. In order to discover interesting association rules that support marketers in designing relevant segment specific campaigns, the association rule mining is performed. On association rules being discovered from each cluster, the TVC module is configured to arrive at interesting campaign design strategies corresponding to each cluster.

In an embodiment, the proposed system and method learns linear time series models such as AR for univariate and VAR for multivariate time series data, from multiple time series instances, and can be applied to short time series, which is not stationary. The description herein describes the method with the help of VAR models. However, the method is equally applicable for other models such as AR models and the like.

The various actions in method 400 can be performed in the order presented, in a different order or simultaneously. Further, in some embodiments, some actions listed in FIG. 3 can be omitted.

Figure 4:
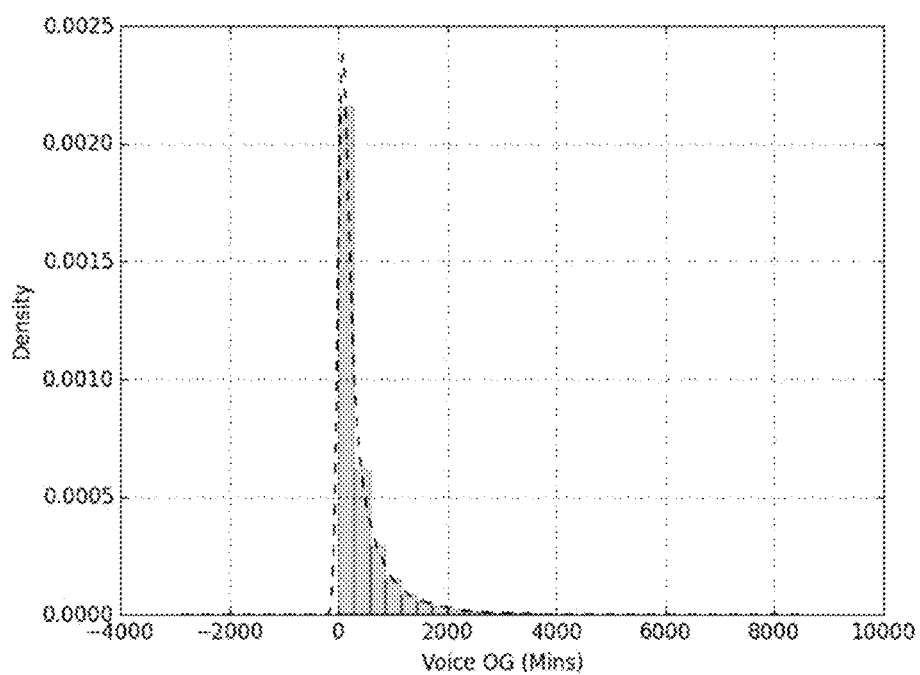
FIGS. 4, 5 and 6 illustrates the individual feature distributions corresponding to voice usage, data usage and SMS usage, according to the embodiments as disclosed herein.
Figure 5:
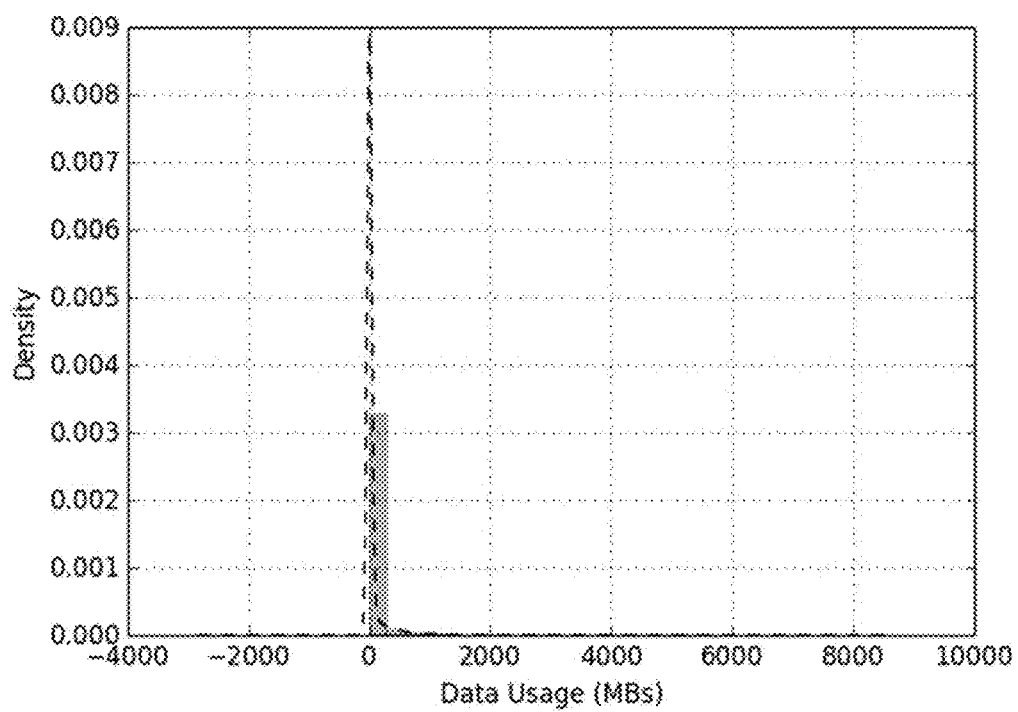
Figure 6:
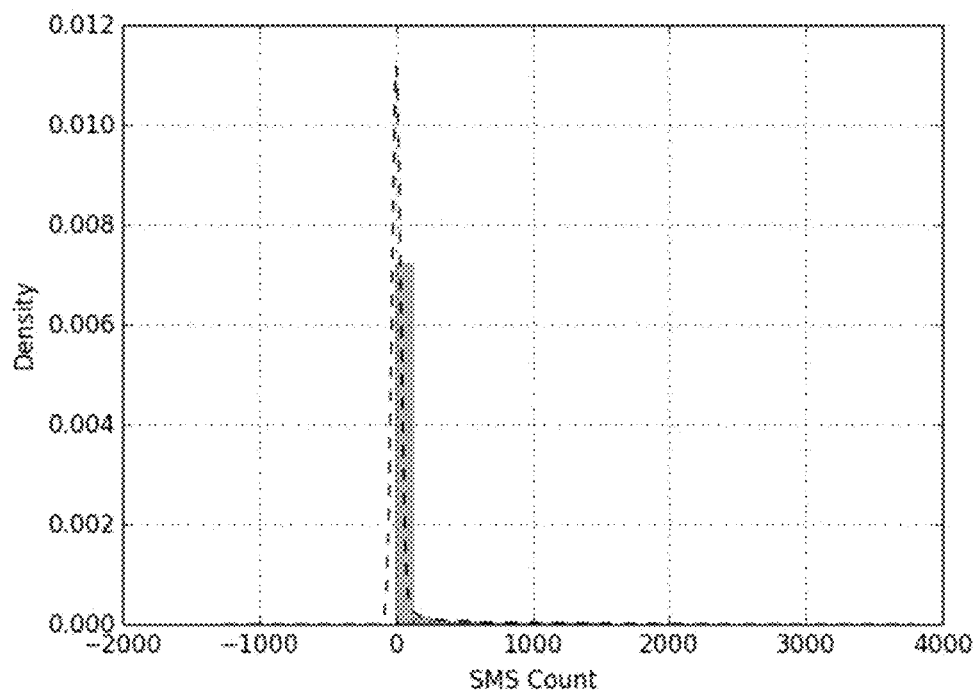

In an embodiment, the communication service provider dataset consist of service usage data pertaining to mobile subscribers across a 6 month time period. Each subscriber is described in terms of three service usage parameters namely VOICE_OG indicating total outgoing minutes if usage for voice calls, data usage indicating the amount of data (in megabytes) consumed by using internet services and SMS usage indicating the number of short messages sent. FIGS. 4, 5 and 6 visualizes the individual feature distributions corresponding to voice usage, data usage and SMS usage. In an embodiment, the table 1 below provides the statistical dataset properties of the communication service provider.

TABLE 1

| | VOICE_OG (Mins) | DATA USAGE (MB) | SMS USAGE (Count) |
|---|---|---|---|
| Range | 0-5734.53 | 0-5702 | 0-2519 |
| Mean | 389.024 | 79.590 | 73.768 |

TABLE 1-continued

|  | VOICE_OG (Mins) | DATA USAGE (MB) | SMS USAGE (Count) |
|---|---|---|---|
| Stddev | 543.790 | 354.249 | 276.901 |
| Min | 0 | 0 | 0 |
| Max | 5734.530 | 5702 | 2519 |
| 25% | 80.160 | 0 | 0 |
| 50% | 193.170 | 0 | 0 |
| 75% | 470.672 | 0.034 | 6 |
| 95% | 1439.672 | 460.497 | 499 |
| 99% | 2710.889 | 1845.852 | 1597 |

In an embodiment, for each dependent variable in the MTS, the correlation with the lagged values of all dependent variables from the entire dataset is calculated to understand the autocorrelations existing among the dependent variables, to ascertain that VAR models can be fit to the communication service provider dataset. Further, the squared error corresponding to each prediction is calculated and a RMSE value based on all predictions made is identified. The optimal number of clusters within the complete dataset is identified by making use of multiple cluster quality measures and by comparing their values corresponding to different values of K (number of clusters). The table 2 below lists the properties of the discovered MTS clusters from the communication service provider dataset.

TABLE 2

| Cluster Id | % of Subscribers | Description |
|---|---|---|
| 0 | 3.45% | Low Voice, Medium Data and Medium SMS |
| 1 | 70.78% | Low Voice, Low Data and Low SMS |
| 2 | 7.53% | Low Voice, Low Data and High SMS |
| 3 | 14.33% | Medium Voice, Low Data and Low SMS |
| 4 | 3.90% | High Voice, Low Data and Low SMS |

As depicted in table 2, some of the clusters that emerged reconfirm the marketing insights that the communication service provider had about its subscriber base. For instance, cluster 1 represents the common population who are primarily low users of all services, constituting almost 71% of the subscriber base. In cluster 2, SMS usage is quite high and fluctuating over time, whereas the data and voice usage is low and declining, which can be representing a youth segment, or students who need an inexpensive communication channel, constituting around 7.5% of the subscriber base. In Cluster 4, voice usage is very high where as data and SMS usage is low, but showing an increasing trend.

In an embodiment, Association rules are mined from each MTS cluster to help marketers in designing campaigns appropriate for each market segment, considering the temporal evolution of user preferences. Further, each of the three service usage parameters (VOICE_OG, DATA, SMS) are segmented separately using K-Means into three clusters, representing three discrete levels of the corresponding values, namely HIGH, MEDIUM and LOW, and learn the corresponding cluster boundaries. Further, aggregated values are calculated corresponding to VOICE, DATA and SMS usages of each user for the 6-month period considered, and the values are discretized based on the cluster boundaries that are discovered. The Table 3 below shows the results from the discretization procedure. The approach described herein can be used for any other service usage parameters and can be obtained for any number of discrete levels. In an embodiment, the discretization procedure need not be always K-means. For instance, a percentile based quantization like $25^{th}$ percentile and below=LOW, $25^{th}$-$50^{th}$ percentile=MEDIUM can be used. In an embodiment, the aggregation can be done at a different granularity also (e.g. average for 3 months and the like).

TABLE 3

| Attribute | Cluster | Mean | SD | Range | Label | % of Subs |
|---|---|---|---|---|---|---|
| VOICE | 1 | 174.19 | 140.05 | 0-547.82 | LOW | 77.86% |
| VOICE | 2 | 921.64 | 302.93 | 547.83-1713.47 | MEDIUM | 19.52% |
| VOICE | 0 | 2506.75 | 795.03 | 1713.48-5734.53 | HIGH | 2.62% |
| DATA | 0 | 17.84 | 69.08 | 0-521.36 | LOW | 95.07% |
| DATA | 2 | 1025.62 | 410.35 | 521.37-2049.85 | MEDIUM | 4.47% |
| DATA | 1 | 3080.05 | 912.57 | 2049.86-5702.62 | HIGH | 0.46% |
| SMS | 0 | 12.86 | 43.77 | 0-362 | LOW | 93.50% |
| SMS | 2 | 712.62 | 237.34 | 363-1184 | MEDIUM | 4.99% |
| SMS | 1 | 1657.49 | 337.87 | 1184-2519 | HIGH | 1.51% |

After discretizing the usage data, the interesting association rules from each of the MTS clusters are identified. In an embodiment, a suitable frequent pattern mining technique such as Apriori can be used for discovering association rules. In cluster 0, rule 2 states that subscribers having medium SMS usage are likely to have medium data usage too, suggesting that cross-selling campaigns for data products, which promote data to medium SMS users, are ideal for this segment. In addition, rule 1 indicates that subscribers with low voice usage and medium data usage is likely to have low SMS usage, suggesting that up selling SMS to such subscribers is probably a bad idea.

TABLE 4

| | | |
|---|---|---|
| 1 | 7006 | 1. VOICE_OG = LOW, SMS = LOW (6491) ==> DATA = LOW (6437) conf: (0.99) |
| | | 2. VOICE_OG = LOW (6667) ==> DATA = LOW (6609) conf: (0.99) |
| | | 3. SMS = LOW (6781) ==> DATA = LOW (6714) conf: (0.99) |
| 2 | 745 | 1. VOICE_OG = LOW, SMS = MEDIUM (192) ==> DATA = LOW (183) conf: (0.95) |

TABLE 4-continued

```
            2. SMS = MEDIUM (223) ==> DATA = LOW (212) conf: (0.95)
            3. VOICE_OG = LOW (627) ==> DATA = LOW (559) conf: (0.89)
            4. VOICE_OG = MEDIUM (90) ==> DATA = LOW (79) conf: (0.88)
3   1418    1. VOICE_OG = MEDIUM, SMS = LOW (1143) ==> DATA = LOW (1108)
               conf: (0.97)
            2. DATA = LOW (1367) ==> VOICE_OG = MEDIUM (1204) conf: (0.88)
            3. DATA = LOW, SMS = LOW (1265) ==> VOICE_OG = MEDIUM (1108)
               conf: (0.88)
            4. SMS = LOW (1305) ==> VOICE_OG = MEDIUM (1143) conf: (0.88)
4   386     1. VOICE_OG = HIGH, SMS = LOW (147) ==> DATA = LOW (147)
               conf: (1)
            2. VOICE_OG = MEDIUM (220) ==> DATA = LOW (219) conf: (1)
            3. VOICE_OG = MEDIUM, SMS = LOW (212) ==> DATA = LOW (211)
               conf: (1)
            4. SMS = LOW (367) ==> DATA = LOW (365) conf: (0.99)
```

As depicted in table 4, In cluster 1, rule 1 indicates that subscribers having low voice and SMS usage are likely to have low data usage as well. Other rule within this cluster also suggests low service consumption behavior in general. This observation suggests that seeding campaigns that give free benefits to subscribers to induce interest in consuming any of these services more can be provided to this segment (e.g. 100 free SMS benefits valid for 2 days).

In cluster 2, rule 2 states that subscribers with medium SMS usage is likely to have low data usage and rule 4 states that subscribers with medium voice usage is likely to have low data usage.

In cluster 3, rule 4 states that subscribers with low data and SMS usage are likely to have medium voice usage, suggesting that campaigns which promote voice services to such subscribes who are currently having low voice usage, would be ideal.

In cluster 4, rule 1 states that subscribers with high voice usage and low SMS usage are likely to have low data usage as well. Other rules within this cluster also indicate high affinity towards voice service and low affinity towards data and SMS.

Figure 7:
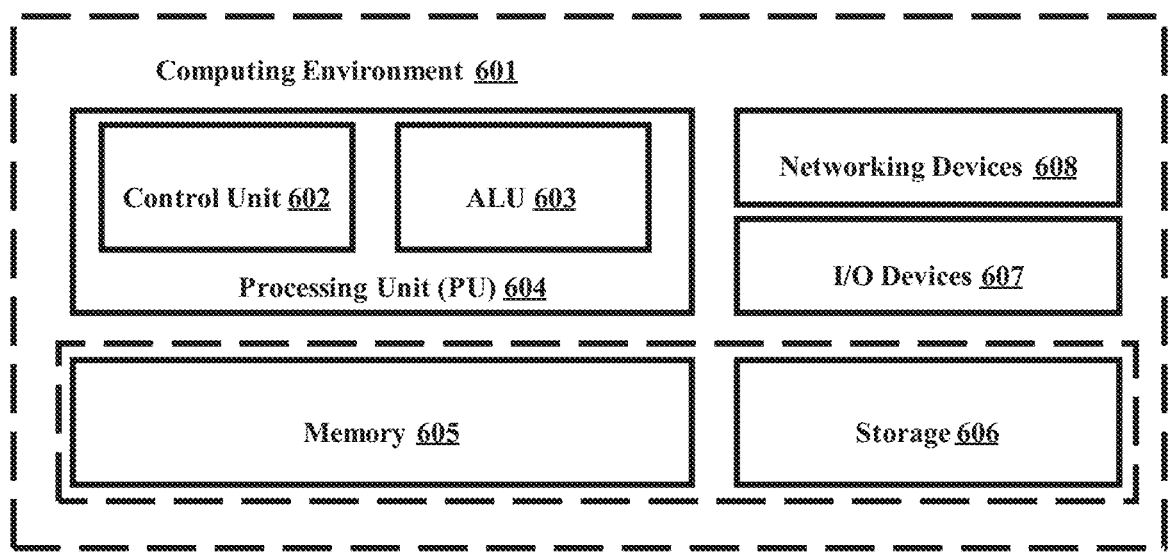
FIG. 7 illustrates a computing environment implementing the method and for providing multivariate time series clustering for customer segmentation, according to the embodiments as disclosed herein.

FIG. 7 illustrates a computing environment implementing the method and system for providing multivariate time series clustering for customer segmentation, according to the embodiments as disclosed herein. As depicted the computing environment 601 comprises at least one processing unit 604 that is equipped with a control unit 602 and an Arithmetic Logic Unit (ALU) 603, a memory 605, a storage unit 606, plurality of networking devices 608 and a plurality Input output (I/O) devices 607. The processing unit 604 is responsible for processing the instructions of the algorithm. The processing unit 604 receives commands from the control unit in order to perform its processing. Further, any logical and arithmetic operations involved in the execution of the instructions are computed with the help of the ALU 603.

The overall computing environment 601 can be composed of multiple homogeneous and/or heterogeneous cores, multiple CPUs of different kinds, special media and other accelerators. The processing unit 604 is responsible for processing the instructions of the algorithm. Further, the plurality of processing units 604 can be located on a single chip or over multiple chips. Further a plurality of nodes such as 601 can be interconnected over a network to form a distributed computing environment, where the method described gets executed in a distributed fashion.

The algorithm comprising of instructions and codes required for the implementation are stored in either the memory unit 605 or the storage 606 or both. At the time of execution, the instructions can be fetched from the corresponding memory 605 and/or storage 606, and executed by the processing unit 604.

In case of any hardware implementations various networking devices 608 or external I/O devices 607 can be connected to the computing environment to support the implementation through the networking unit and the I/O device unit.

Embodiments disclosed herein enable compression of large amounts of temporal data related to users to smaller and more manageable amounts of data, hereby reducing the time required for processing the data and complexity of the system required for computing.

The embodiments disclosed herein can be implemented through at least one software program running on at least one hardware device and performing network management functions to control the network elements. The network elements shown in FIG. 1 through FIG. 2 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A computer-implemented method comprising steps of:
    representing, using a user management unit that is operatively coupled with a data server and a user device, time-varying preferences of a plurality of users as corresponding and respective to a plurality of Multivariate Time Series (MTS), said time-varying preferences of said plurality of users being determined based on usage data associated with a plurality of user devices of said plurality of users, said usage data being indicative of usage pattern of said respective user devices by said plurality of users;
    randomly allocating, through the user management unit, each MTS of the plurality of MTS to a cluster that is selected from 'K' clusters, wherein each MTS is considered to be generated from a vector auto-regression (VAR) model representing a cluster;

learning, at the user management unit, parameters associated with each of 'K' vector auto-regression (VAR) models corresponding to the 'K' clusters based on estimation of the parameters of each of the said 'K' VAR models, each of VAR models representing evolution of the parameters over the same time period;

allocating, using said user management unit, said each MTS of the plurality of MTS to one of the 'K' VAR models that accurately explains said MTS, wherein the allocation being made based on a correlation between the parameters associated with 'K' VAR models, said allocation being made further based on average prediction Root Mean Squared Error (RMSE) on said each MTS;

re-estimating, using a time variant clustering (TVC) module of the user management unit, parameters of each of said 'K' VAR models corresponding to 'K' clusters based on expectation-maximization (EM) technique;

performing, using said time variant clustering (TVC) module, re-allocation of said each MTS of the plurality of MTS to one of the 'K' VAR models based on re-estimated parameters of each of said K VAR models, wherein the steps of re-estimating the parameters, and performing re-allocation of said each MTS of the plurality of MTS to one of the 'K' VAR models are performed iteratively and simultaneously until a convergence criterion is met;

discretizing, using said time variant clustering (TVC) module, service usage parameters through a user device into arbitrary number of discrete levels by aggregating at a temporal granularity and performing a percentile based segmentation; and identifying, using said time variant clustering (TVC) module, one or more service usage patterns over time and one or more association rules corresponding to each of the 'K' clusters, wherein the identification of the one or more association rules is facilitated by user segmentation with the MTS clustering.

2. The computer-implemented method as claimed in claim 1, wherein said method further comprises the step of performing association rule mining on said cluster based on at least one discretized service usage parameter to arrive at at least one campaign design strategy that is specific to the cluster.

3. The computer-implemented method as claimed in claim 1, wherein said time variant clustering (TVC) module, through the user device, identifies an optimal number of clusters that are temporal using at least one cluster quality measure.

4. The computer-implemented method as claimed in claim 1, said time variant clustering (TVC) module, through said user device, applies said clustering to short time series that are not stationary.

5. A system comprising:
a user management unit that is operatively coupled with a data server and a user device, said user management unit comprising time variant clustering (TVC) module and a processor that executes one or more computer-implemented instructions to:
represent time-varying preferences of a plurality of users as corresponding and respective to a plurality of Multivariate Time Series (MTS), said time-varying preferences of said plurality of users being determined based on usage data associated with a plurality of user devices of said plurality of users, said usage data being indicative of usage pattern of said respective user devices by said plurality of users;

randomly allocate each MTS of the plurality of MTS to a cluster that is selected from 'K' clusters, wherein each MTS is considered to be generated from a vector auto-regression (VAR) model representing a cluster;

learn parameters associated with each of 'K' VAR models corresponding to the 'K' clusters based on estimation of the parameters of each of the said 'K' VAR models, each of VAR models representing evolution of the parameters over the same time period;

allocate, using said user management unit, said each MTS of the plurality of MTS to one of the 'K' VAR models that accurately explains said MTS, wherein the allocation being made based on a correlation between the parameters associated with 'K' VAR models, said allocation being made further based on average prediction Root Mean Squared Error (RMSE) on said each MTS;

said time variant clustering (TVC) module, through said processor, execute one or more computer-implemented instructions to:
re-estimate-parameters of each of said 'K' VAR models corresponding to 'K' clusters based on expectation-maximization (EM) technique;

perform re-allocation of said each MTS of the plurality of MTS to one of the 'K' VAR models based on re-estimated parameters of each of said K VAR models, wherein the re-estimation of the parameters and re-allocation of said each MTS of the plurality of MTS to one of the 'K' VAR models are performed iteratively and simultaneously until a convergence criterion is met;

discretize service usage parameters through a user device into arbitrary number of discrete levels by aggregating at a temporal granularity and performing a percentile based segmentation; and identify one or more service usage patterns over time and one or more association rules corresponding to each of the 'K' clusters, wherein the identification of the one or more association rules is facilitated by user segmentation with the MTS clustering.

6. The system as claimed in claim 5, wherein said user management unit performs association rule mining on said cluster based on at least one discretized service usage parameter to arrive at at least one campaign design strategy that is specific to the cluster.

7. The system as claimed in claim 5, wherein said time variant clustering (TVC) module, through the user device, identifies an optimal number of clusters that are temporal using at least one cluster quality measure.

8. The system as claimed in claim 5, said time variant clustering (TVC) module, through said user device, applies said clustering to short time series that are not stationary.

* * * * *